(12) United States Patent
Iida

(10) Patent No.: US 12,517,472 B2
(45) Date of Patent: Jan. 6, 2026

(54) ELECTRODE TERMINAL, MODULE AND WATCH

(71) Applicant: CASIO COMPUTER CO., LTD., Tokyo (JP)

(72) Inventor: Masataka Iida, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 350 days.

(21) Appl. No.: 18/279,026

(22) PCT Filed: Jan. 26, 2022

(86) PCT No.: PCT/JP2022/003908
§ 371 (c)(1),
(2) Date: Aug. 25, 2023

(87) PCT Pub. No.: WO2022/181262
PCT Pub. Date: Sep. 1, 2022

(65) Prior Publication Data
US 2024/0295858 A1    Sep. 5, 2024

(30) Foreign Application Priority Data

Feb. 26, 2021 (JP) ................................ 2021-030309
Feb. 26, 2021 (JP) ................................ 2021-030312

(51) Int. Cl.
| | | |
|---|---|---|
| G04G 17/06 | (2006.01) | |
| G04C 10/00 | (2006.01) | |
| H01M 50/559 | (2021.01) | |

(52) U.S. Cl.
CPC ............ *G04G 17/06* (2013.01); *G04C 10/00* (2013.01); *H01M 50/559* (2021.01); *H01M 2220/30* (2013.01)

(58) Field of Classification Search
None
See application file for complete search history.

(56) References Cited

U.S. PATENT DOCUMENTS

| | | | |
|---|---|---|---|
| 6,527,584 B2 * | 3/2003 | Ninomiya | ........... H01M 50/216 429/97 |
| 6,733,327 B2 | 5/2004 | Sugimoto et al. | |
| 7,016,264 B2 | 3/2006 | Ueno et al. | |
| 10,103,461 B2 * | 10/2018 | Yokoo | .................... G04G 17/06 |
| 2002/0022399 A1 | 2/2002 | Ninomiya | |

(Continued)

FOREIGN PATENT DOCUMENTS

| | | | |
|---|---|---|---|
| JP | S57104457 U | 6/1982 | |
| JP | H0216515 Y2 | 5/1990 | |

(Continued)

OTHER PUBLICATIONS

Extended European Search Report dated Feb. 13, 2025 for European Patent Application No. 22759303.5.

(Continued)

*Primary Examiner* — Regis J Betsch
*Assistant Examiner* — Michael James Walker
(74) *Attorney, Agent, or Firm* — Scully, Scott, Murphy & Presser, P.C.

(57) ABSTRACT

An electrode terminal which facilitates the housing of a battery, a module equipped with the electrode terminal, and a timepiece equipped with the electrode terminal and the module.

11 Claims, 10 Drawing Sheets

(56) References Cited

U.S. PATENT DOCUMENTS

| | | |
|---|---|---|
| 2003/0099160 A1 | 5/2003 | Ueno et al. |
| 2004/0038585 A1 | 2/2004 | Sugimoto et al. |
| 2006/0013074 A1 | 1/2006 | Ueno et al. |
| 2006/0140059 A1* | 6/2006 | Tada ............... G04G 19/00 368/204 |
| 2006/0164821 A1 | 7/2006 | Usui |

FOREIGN PATENT DOCUMENTS

| | | |
|---|---|---|
| JP | 2002063882 A | 2/2002 |
| JP | 2003227884 A | 8/2003 |
| JP | 2004053381 A | 2/2004 |
| JP | 2004087191 A | 3/2004 |
| JP | 2004132772 A | 4/2004 |
| JP | 2007155595 A | 6/2007 |
| JP | 2008010301 A | 1/2008 |
| JP | 4120302 B2 | 7/2008 |
| JP | 2009193843 A | 8/2009 |
| JP | 4761450 B2 | 8/2011 |

OTHER PUBLICATIONS

International Search Report dated Apr. 19, 2022 issued in PCT/JP2022/003908.

* cited by examiner

ELECTRODE TERMINAL, MODULE AND WATCH

CROSS REFERENCE TO RELATED APPLICATIONS

This is a U.S. National Phase application of International Application No. PCT/JP2022/003908, filed Jan. 26, 2022, which is based on and claims priority from Japanese Patent Applications No. 2021-030309, filed Feb. 26, 2021, and No. 2021-030312, filed Feb. 26, 2021, the entire contents of both of which are incorporated herein by reference.

TECHNICAL FIELD

The present invention relates to an electrode terminal that is used for electronic devices such as wristwatches, cellular phones, and portable information terminals, a module equipped with the electrode terminal, and a timepiece equipped with the electrode terminal and the module.

BACKGROUND ART

For example, a battery housing structure for housing a button-shaped battery is known in which an electrode terminal that comes in contact with the outer circumferential surface of a battery serving as a plus electrode includes a fixing section arranged on the inner circumferential rim of a battery housing section and a pair of contacting arm sections extending from the sides of the fixing section in the circumferential directions of the battery housing section, as described in Patent Document 1.

PRIOR ART DOCUMENT

Patent Document

Patent Document 1: JP 2009-193843 A

SUMMARY OF INVENTION

Problem to be Solved by the Invention

In the case of the electrode terminal of this type of battery housing structure, the pair of contacting arm sections extending from the sides of the fixing section in the circumferential directions of the battery housing section are oriented to the inner side of the battery housing section, whereby the ends of this pair of extended contacting arm sections are arranged protruding toward the inner side of the battery housing section. As a result, this electrode terminal is structured such that, when a battery is housed in the battery housing section, the ends of the pair of contacting arm sections are pressed against the outer circumferential surface of the battery and flexurally deformed in directions to be pressed out of the inner side of the battery housing section.

Accordingly, the electrode terminal of this type of battery housing structure has a problem in that, due to the ends of the pair of contacting arm sections protruding toward the inner side of the battery housing section, these protruding ends of the pair of contacting arm sections become obstructive and the battery collides with these ends of the pair of contacting arm sections when the battery is housed in the battery housing section, whereby the battery is difficult to be housed in the battery housing section and the housing of the battery is troublesome.

An object of the present invention is to provide an electrode terminal which facilitates the housing of a battery, a module equipped with the electrode terminal, and a timepiece equipped with the electrode terminal and the module.

Means for Solving the Problem

An embodiment of the present invention is an electrode terminal comprising: a main body section which is held in a circumferential rim portion of a battery housing section that houses a battery; a first contact section which is provided on the main body section and comes in contact with an outer circumferential surface of the battery housed in the battery housing section; and a second contact section which is provided on a portion of the main body section located on a side of a circuit board that is arranged on an outer surface of the battery housing section and pressed against the circuit board in a manner to tilt the first contact section and the main body section toward a side opposite to the circuit board.

DESCRIPTION OF EMBODIMENTS

An embodiment where the present invention has been applied in a wristwatch will hereinafter be described with reference to FIG. 1 to FIG. 10.

Figure 1:
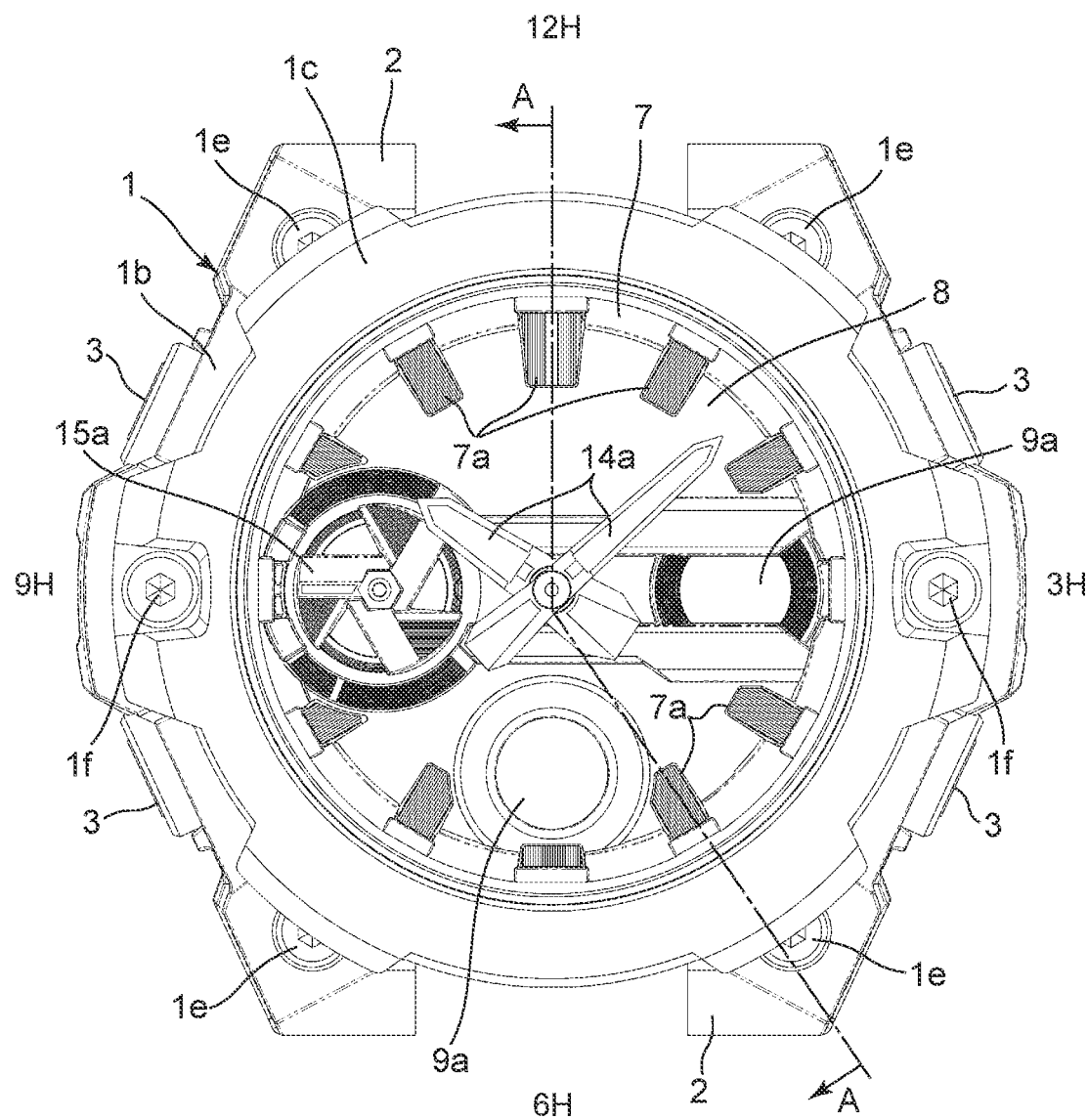
FIG. 1 is an enlarged front view of an embodiment where the present invention has been applied in a wristwatch.

This wristwatch includes a wristwatch case 1, as shown in FIG. 1. On the six o'clock side and twelve o'clock side of this wristwatch case 1, band attachment sections 2 to which watch bands (not shown in the drawings) are attached are provided. On the two o'clock side, four o'clock side, eight o'clock side, and ten o'clock side of this wristwatch case 1, switch sections 3 are provided.

Figure 2:
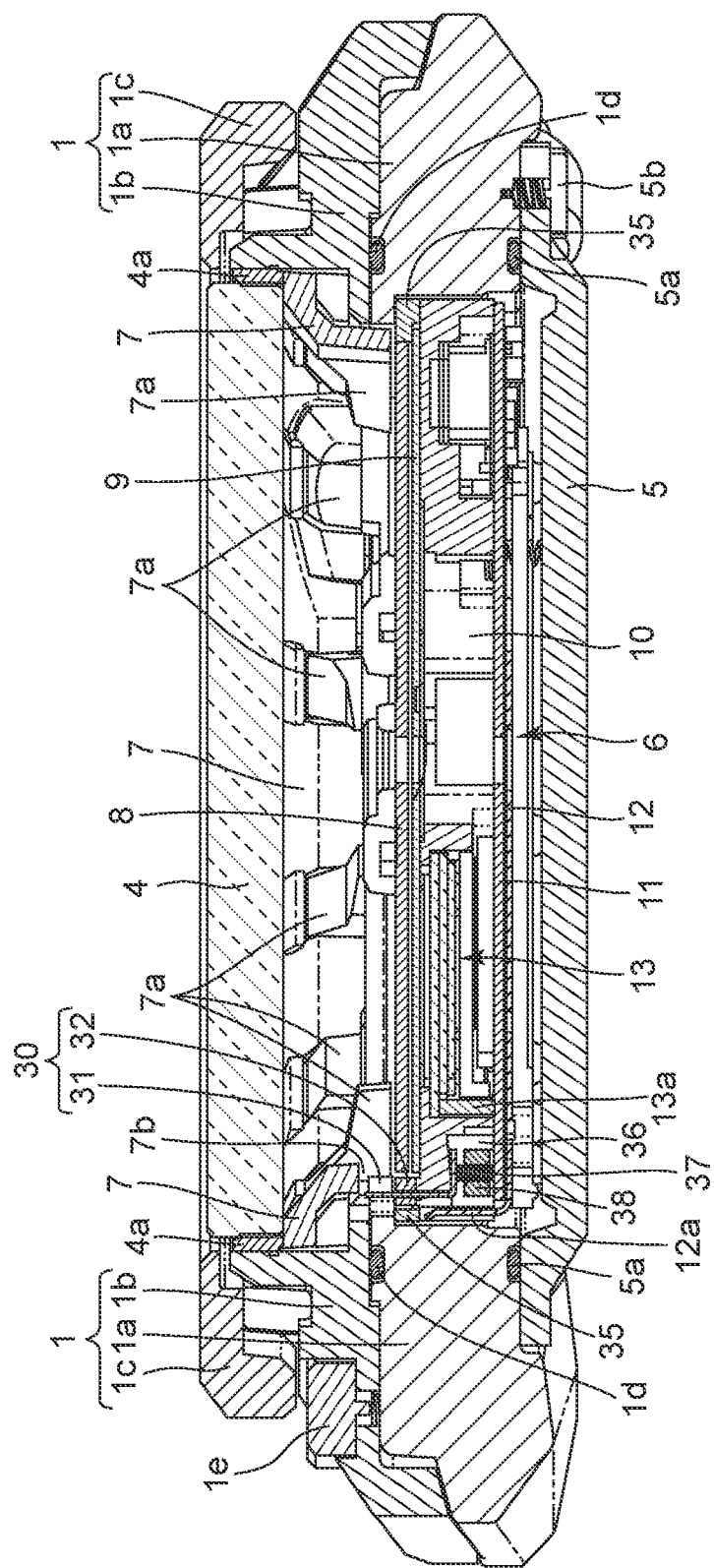
FIG. 2 is an enlarged cross-sectional view of the wristwatch taken along the A-A arrow view in FIG. 1.

Also, this wristwatch includes a lower case 1a, an upper case 1b, and an exterior case 1c, as shown in FIG. 1 and FIG. 2. The lower case 2a and the upper case 1b are made of metal, and the upper case 1b is attached to the lower case 1a by a plurality of screws 1e via a waterproof ring 1d. The exterior case 1c is made of an elastic synthetic resin such as urethane resin, and attached covering the outer circumferential part of the upper part of the upper case 1b by a plurality of screws 1f.

To the upper opening of this wristwatch case 1, or in other words, to the upper opening of the upper case 1b, a watch glass 4 is attached via a packing 4a, as shown in FIG. 2. To the lower part of this wristwatch case 1, or in other words, to the lower part of the lower case 1a, a back cover 5 is attached by a plurality of screws 5b via a waterproof packing 5a. In this wristwatch case 1, or more specifically, in the lower case 1a, a timepiece module 6 is provided.

In the inner circumferential part of the wristwatch case 1, or more specifically, in the inner circumferential part of the upper case 1b located below the watch glass 4, a ring-shaped parting member 7 is provided, as shown in FIG. 1 and FIG. 2. On this parting member 7, a plurality of hour marks 7a which corresponds to one o'clock to twelve o'clock is arranged at equal intervals. This parting member 7 is structured such that a later-described dial 8 of the timepiece module 6 is arranged therebelow.

Figure 3:
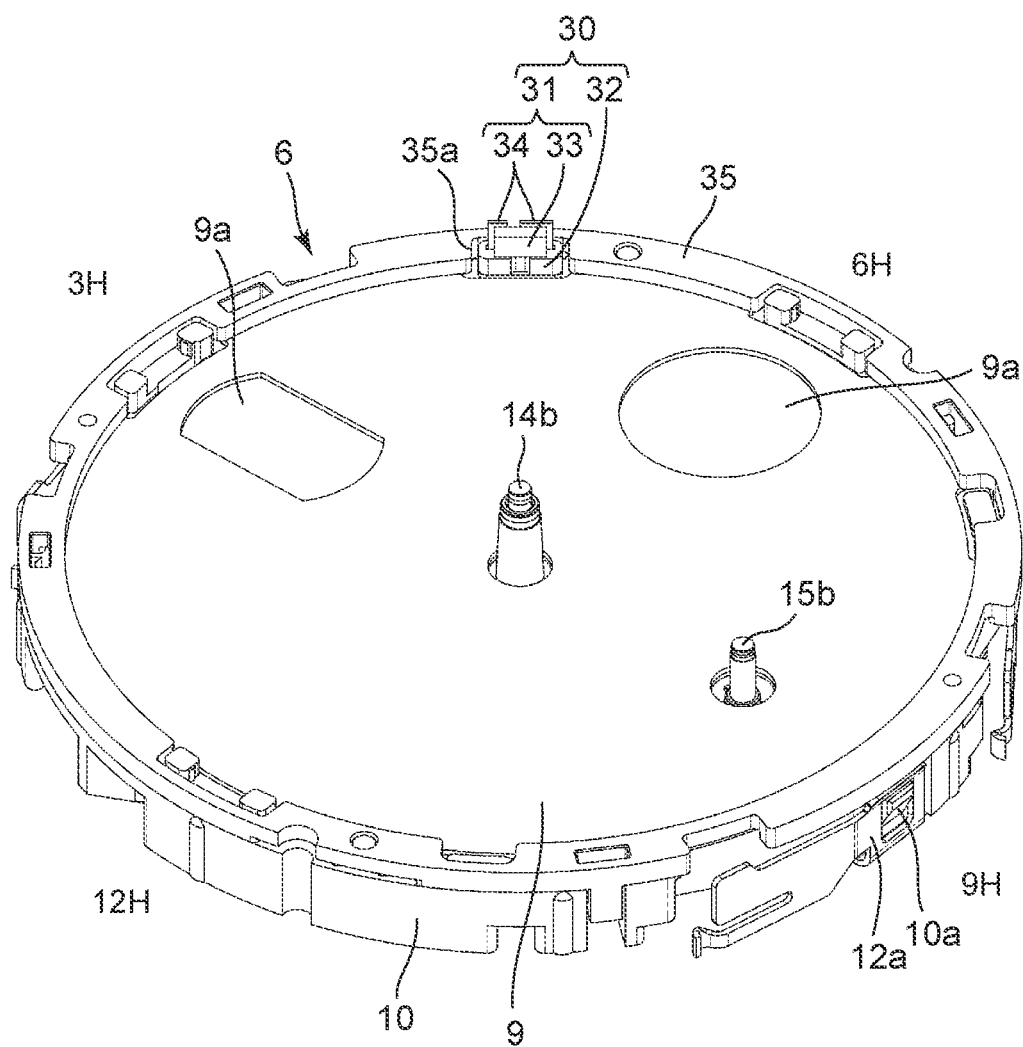
FIG. 3 is an enlarged perspective view of a timepiece module shown in FIG. 2.

The timepiece module 6 includes a housing 10 made of a synthetic resin, as shown in FIG. 2 and FIG. 3. On the upper surface of the housing 10, a solar panel 9 is provided while being held down by a later-described panel hold down member 35. On the upper surface of this solar panel 9, the light-transmissive dial 8 which is transparent or semi-transparent is arranged. Also, to the lower surface of the housing 10, a circuit board 11 is attached by a plurality of screws 11a, as shown in FIG. 2 and FIG. 4.

Figure 4:
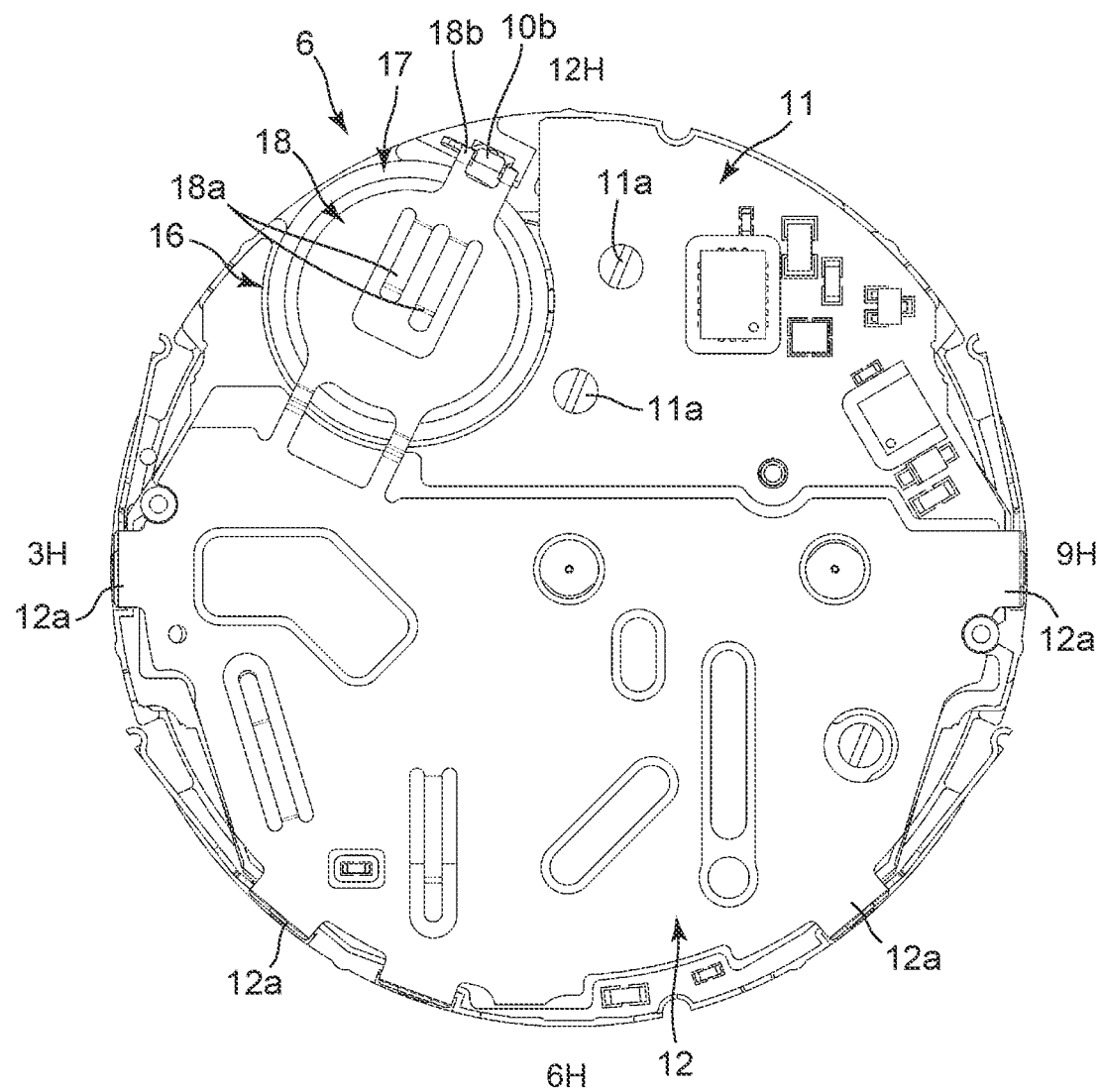
FIG. 4 is an enlarged back view of the timepiece module shown in FIG. 3.
Figure 9:
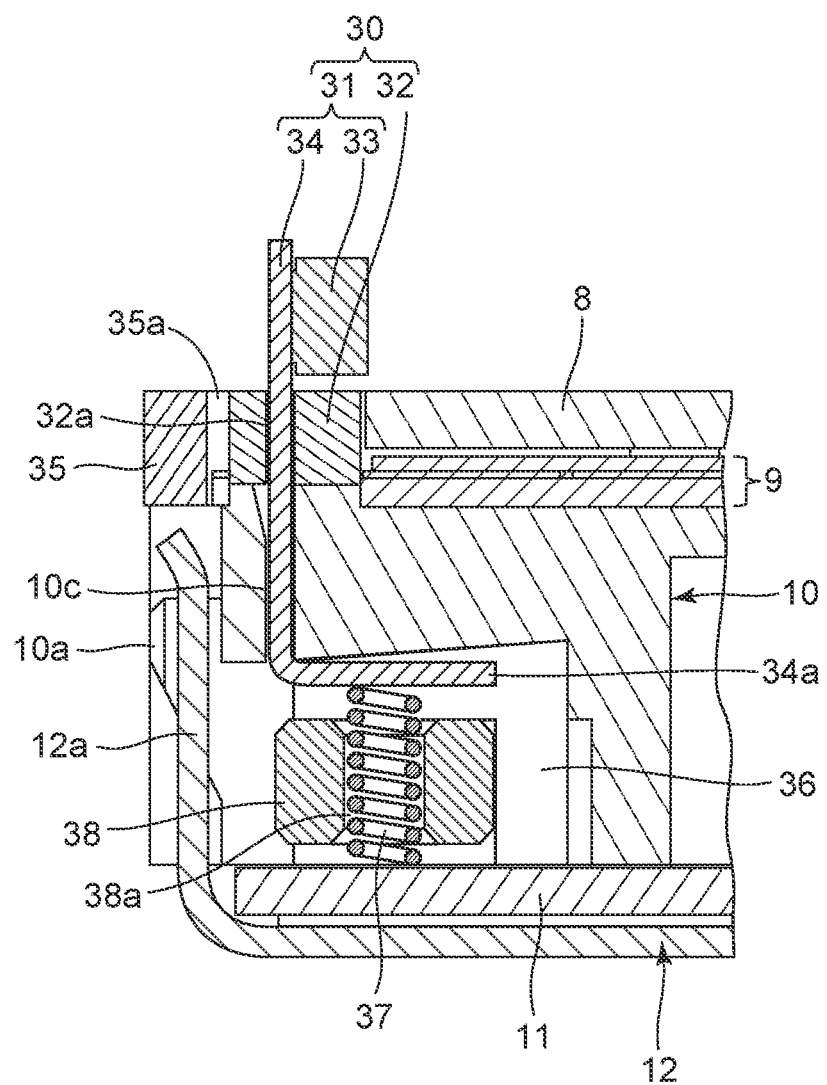
FIG. 9 is an enlarged cross-sectional view showing a main portion of a lighting device of the timepiece module in FIG. 2.

On the lower surface of the circuit board 11, a metal hold down plate 12 is arranged, as shown in FIG. 2 and FIG. 4. This hold down plate 12, which is located on a substantially half area of the housing 10 on the six o'clock side, is structured such that hook sections 12a formed on plural portions on its outer peripheral part are engaged with engaging projections 10a formed on the outer circumferential surface of the housing 10, as shown in FIG. 3 and FIG. 9. As a result, the hold down plate 12 is attached to the housing 10 while holding down the circuit board 11 on the housing 10.

Figure 5:
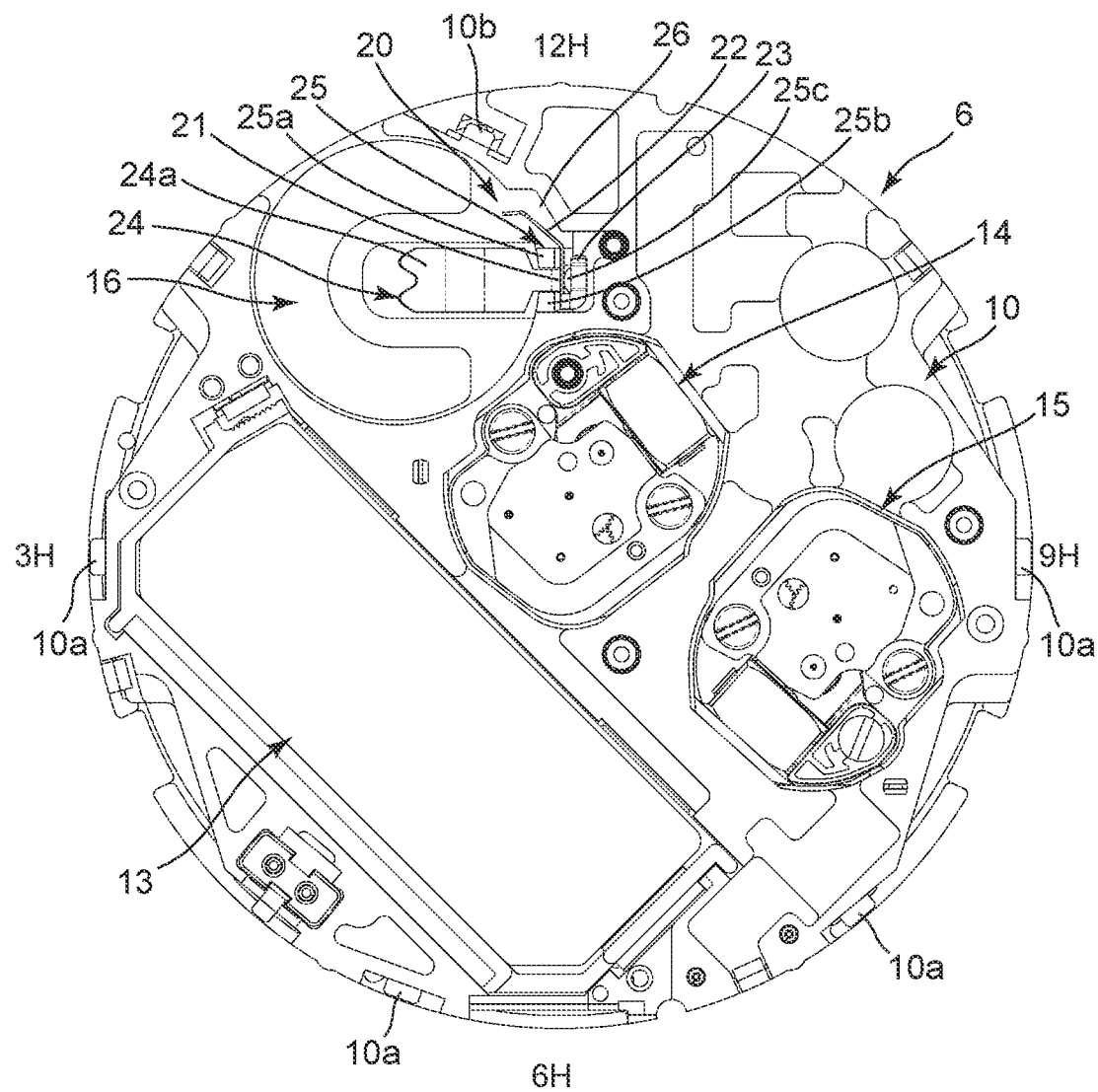
FIG. 5 is an enlarged back view showing a state where a hold down plate and a circuit board have been detached from the timepiece module in FIG. 4.

Also, the housing 10 has provided therein a display panel 13 which electrooptically displays various information necessary for timepiece functions such as information regarding a time of day, a date, and a day of the week, a first timepiece movement 14 which drives pointers 14a such as a minute pointer and an hour pointer, a second timepiece movement 15 which drives a function pointer 15a, and a battery housing section 16 which houses a button-shaped battery 17, as shown in FIG. 5.

The display panel 13, which is a planar display element such as crystal display element or an a liquid electroluminescence (EL) display element, is formed in a substantially rectangular shape and diagonally arranged from the three o'clock side to the six o'clock side of the housing 10, as shown in FIG. 2 and FIG. 5. This display panel 13 is supported on the circuit board 11 while being electrically connected thereto by an interconnector 13a. Also, the solar panel 9 has display window sections 9a formed in its two portions on the three o'clock side and the six o'clock side, and is structured such that information displayed on the display panel 13 can be checked through these display window sections 9a, as shown in FIG. 3.

The first timepiece movement 14 includes a first step motor and a first gear train mechanism, and is provided in a substantially central portion of the housing 10, as shown in FIG. 5. This first timepiece movement 14 is structured such that a pointer shaft 14b protrudes above the dial 8 through the solar panel 9 and the dial 8, the pointers 14a are attached to an upper end portion of this protruding pointer shaft 14b, and the pointers 14a are driven above the dial 8, as shown in FIG. 3.

The second timepiece movement 15 includes a second step motor and a second gear train mechanism, and is provided on the nine o'clock side of the housing 10, as shown in FIG. 5. This second timepiece movement 15 is structured such that a function pointer shaft 15b protrudes above the dial 8 through the solar panel 9 and the dial 8, the function pointer 15a is attached to an upper end portion of this protruding function pointer shaft 15b, and the function pointer 15a is driven above the dial 8, as shown in FIG. 3.

Figure 6:
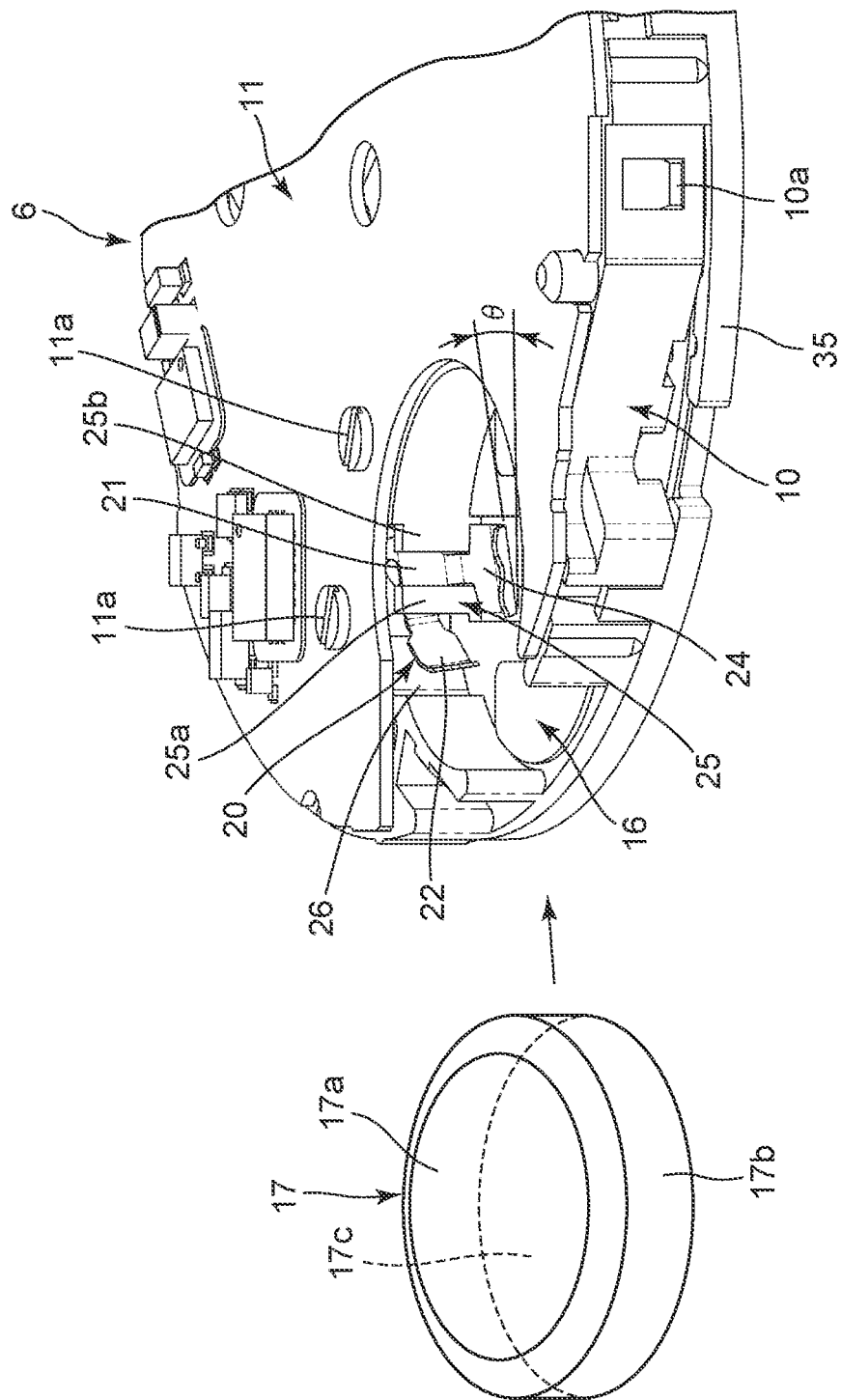
FIG. 6 is an enlarged perspective view showing a main portion of a battery housing section of the timepiece module in FIG. 5, in which the circuit board has been arranged on a housing and an electrode terminal has been tilted.

The battery housing section 16 is formed in a circular recess shape whose size is substantially equal to that of the battery 17 and provided on a substantially one o'clock side of the housing 10, as shown in FIG. 4 to FIG. 6. In this battery housing section 16, a battery hold down section 18 which holds down the battery 17 housed therein and electrically connects an electrode surface 17a serving as the minus electrode of the battery 17 to the circuit board 11, and an electrode terminal 20 which electrically connects an outer circumferential surface 17b serving as the plus electrode of the battery 17 to the circuit board 11 are provided, as shown in FIG. 4 to FIG. 6.

Figure 8:
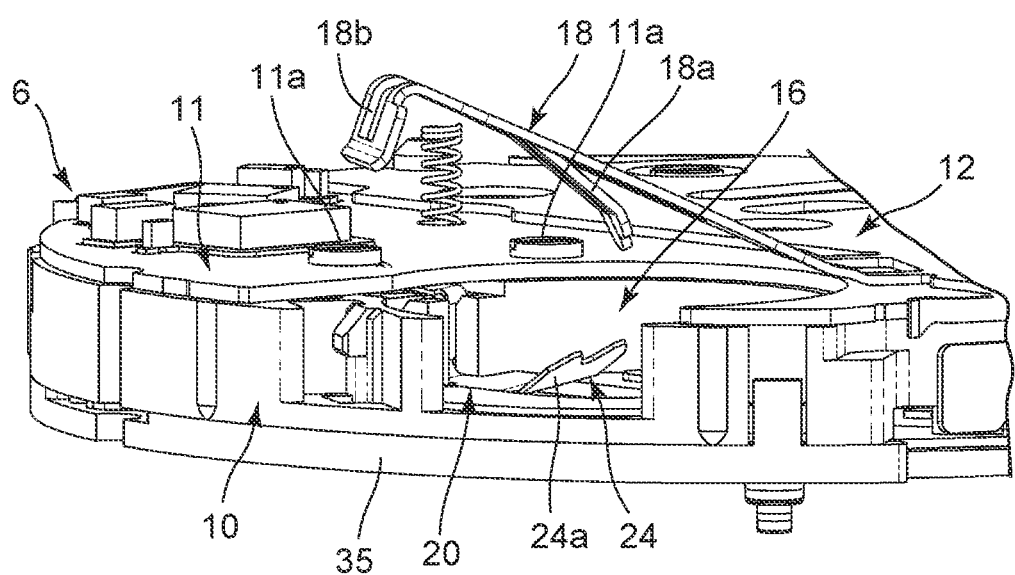
FIG. 8 is an enlarged perspective view showing a main portion of a battery hold down section in FIG. 6 before a battery is housed in and held down on the battery housing section.

The battery hold down section 18 is formed on the metal hold down plate 12 that holds down the circuit board 11 on the housing 10, and positioned extending across the battery housing section 16 from the three o'clock side toward a substantially twelve o'clock side, as shown in FIG. 4. In a middle portion of the battery hold down section 18, a plurality of contacting pieces 18a which comes in contact with the electrode surface 17a of the battery 17 is provided. When the battery 17 is to be housed in the battery housing section 16, this battery hold down section 18 is pulled upward by its portion on the three o'clock side of the hold down plate 12 being bent, as shown in FIG. 8.

Also, this battery hold down section 18 is structured such that a battery hook section 18b formed on its rim portion on the twelve o'clock side engages with an engaging section 10b provided on the twelve o'clock side of the housing 10 and positioned outside the battery housing section 16, as shown in FIG. 4. When the battery hook section 18b engages with the engaging section 10b on the twelve o'clock side of the housing, this battery hold down section 18 holds down the battery 17 on the battery housing section 16 with the plurality of contacting pieces 18a being in contact with the electrode surface 17a of the battery 17.

Figure 7:
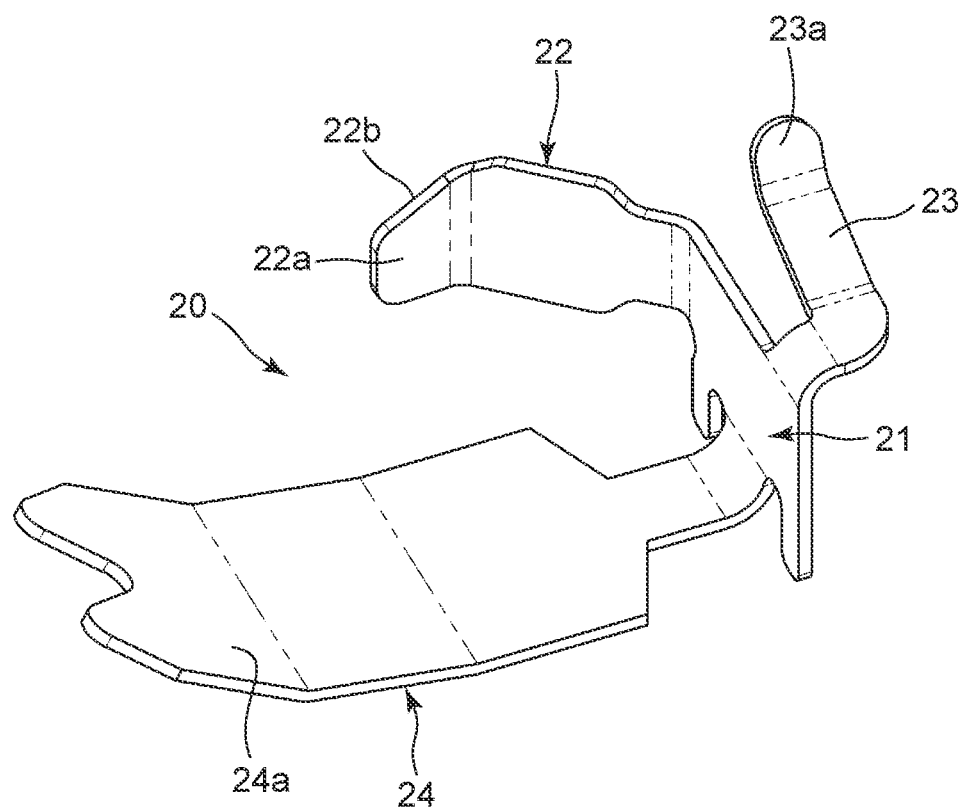
FIG. 7 is an enlarged perspective view of the electrode terminal of the battery housing section shown in FIG. 6.

On the other hand, the electrode terminal 20 includes a main body section 21 which is held close to an inner circumferential portion of the battery housing section 16, and a first contact section 22 which is provided on a side portion of the main body section 21 and comes in contact with the outer circumferential surface 17b of the battery 17 housed in the battery housing section 16, as shown in FIG. 5 to FIG. 7. Also, this electrode terminal 20 includes a second contact section 23 which is provided on one end portion (upper end portion in FIG. 7) of the main body section 21 on the circuit board 11 side and against which the circuit board 11 is pressed, and a receiving section 24 which is formed on the other end portion (lower end portion in FIG. 7) of the main body section 21 on the side opposite to the circuit board 11 and against which a non-electrode surface 17c of the battery 17 on the side opposite to the electrode surface 17a is pressed.

This electrode terminal 20 is formed such that the main body section 21, the first contact section 22, the second contact section 23, and the receiving section 24 are integrally formed by a conductive metal plate such as stainless steel being subjected to bend processing such as press processing and sheet metal processing, as shown in FIG. 7. The main body section 21 is vertically formed in a flat plate shape and held by a holding section 25 provided close to the inner circumferential part of the battery housing section 16, as shown in FIG. 5 and FIG. 6.

The holding section 25, which holds the main body section 21 of the electrode terminal 20 at three points, is provided close to an inner circumferential portion of the battery housing section 16 located substantially diagonally to an inner circumferential portion of the battery housing section 16 located in the outer circumferential part of the housing 10, as shown in FIG. 5 and FIG. 6. More specifically, the holding section 25 is provided close to an inner circumferential portion of the battery housing section 16 located on a virtual straight line intersecting with a virtual straight line extending in the longitudinal direction of the battery hold down section 18 and on a virtual straight line extending from the twelve o'clock side toward the six o'clock side. This holding section 25 includes three holding wall sections 25a to 25c.

Among these three holding wall sections 25a to 25c, two holding wall sections 25a and 25b are provided in the inner circumferential part of the battery housing section 16, as shown in FIG. 5 and FIG. 6. Also, the remaining one holding wall section 25c is provided outside the battery housing section 16 with its semi-cylindrical projection corresponding to a middle point between the two holding wall sections 25a and 25b. As a result, the holding section 25 is structured such that, by being inserted and held between the two holding wall sections 25a and 25b and the one holding wall section 25c, the main body section 21 is held in a manner to be tiltable.

The first contact section 22 extends from a side portion of the main body section 21 along the inner circumferential surface of the battery housing section 16, and an edge section 22a of the extending first contact section 22 is bent in a radial direction toward the inner side of the battery housing section 16, as shown in FIG. 5 to FIG. 7. This first contact section 22 is structured such that the leading end side of the bent edge section 22a protrudes into the battery housing section 16, and this leading end comes in contact with the outer circumferential surface 17b of the battery 17 housed in the battery housing section 16.

The edge section 22a of the first contact section 22 is formed in a tapered shape whose side section (upper side section in FIG. 7) 22b opposing the circuit board 11 has been inclined toward the side opposite to the circuit board 11 (lower side in FIG. 7), as shown in FIG. 7. As a result, this edge section 22a of the first contact section 22 is structured such that, when an outer circumferential portion of the battery 17 comes in contact with the side section 22b protruding in the battery housing section 16 from diagonally above, this outer circumferential portion of the battery 17 slides along the inclined side section 22b, whereby the battery 17 is housed in the battery housing section 16, as shown in FIG. 5.

In the inner circumferential part of the battery housing section 16, a terminal housing section 26 in which the first contact section 22 is arranged is formed along the inner circumferential surface of the battery housing section 16, as shown in FIG. 5. This terminal housing section 26 is open toward the inner side of the battery housing section 16, and structured such that the end portion of the tapered edge section 22a of the first contact section 22 protrudes into the battery housing section 16 from this open portion.

The second contact section 23 is formed extending in the same direction as the first contact section 22 from one end portion (upper end portion in FIG. 7) of the main body section 21 on the circuit board 11 side in a manner to be gradually away from the first contact section 22 and to obliquely extend toward the circuit board 11 (upper side in FIG. 7), as shown in FIG. 5 and FIG. 7. As a result, the second contact section 23 is structured such that its obliquely extending edge section 23a protrudes from the housing 10 toward the circuit board 11 side and an electrode (not shown in the drawings) of the circuit board 11 is pressed against this protruding edge section 23a.

Also, the second contact section 23 is structured such that, when the circuit board 11 is arranged on the lower surface (upper surface in FIG. 6) of the housing 10 and attached thereto by the plurality of screws 11a, this second contact section 23 is pressed toward the housing 10 side by the circuit board 11, as shown in FIG. 6 and FIG. 7. As a result, the main body section 21 is structured such that, when the second contact section 23 is pressed by the circuit board 11, this main body section 21 is tilted at an inclination angle θ with it being held by the holding section 25 of the housing 10, and the first contact section 22 is tilted at the inclination angle θ toward the side opposite to the circuit board 11 (lower side in FIG. 7) along with this tilting of the main body section 21.

The receiving section 24, which is a plate spring, is provided extending from the other end portion (lower end portion in FIG. 7) of the main body section 21 located on the side opposite to the circuit board 11 toward the center of the inner area of the battery housing section 16 in parallel with the bottom surface of the battery housing section 16, as shown in FIG. 5 to FIG. 7. In this receiving section 24, an edge section 24a extending toward the center of the inner area of the battery housing section 16 is obliquely bent toward the non-electrode surface 17c of the battery 17 (upper side in FIG. 6) arranged in the battery housing section 16.

As a result, in the electrode terminal 20 in an initial state before the circuit board is attached to the housing 10, the main body section 21 has been held by the holding section 25 without being tilted, the first contact section 22 has been arranged in the terminal housing section 26 without being tilted, the second contact section 23 has been tilted toward the circuit board 11 side from the housing 10, the edge section 23a has been arranged protruding from the housing 10 toward the circuit board 11 side, and the receiving section 24 has been arranged in parallel with the bottom part of the battery housing section 16, as shown in FIG. 5.

Also, this electrode terminal 20 is structured such that, when the circuit board 11 is arranged on and attached to the upper surface of the housing 10, the second contact section 23 is pressed by the circuit board 11, whereby the main body section 21 is tilted at the inclination angle θ, and the first contact section 22 and the receiving section 24 are tilted in the same direction at the same inclination angle θ along with this tilting of the main body section 21, as shown in FIG. 6.

Moreover, this electrode terminal 20 is structured such that, when the battery 17 is arranged in the battery housing section 16 and held down by the battery hold down section 18 in the state shown in FIG. 6, the receiving section 24 is pressed by the non-electrode surface 17c of the battery 17 and its tilting is released with the second contact section 23 being pressed against the circuit board 11, and the tilting of the main body section 21 and that of the first contact section 22 are released along therewith.

More specifically, this electrode terminal 20 is structured such that, when the receiving section 24 is pressed by the non-electrode surface 17c of the battery 17 in the state shown in FIG. 6 and its tilting is released such that the receiving section 24 becomes parallel to the bottom part of the battery housing section 16, the tilting of the main body section 21 and that of the first contact section 22 are released with the second contact section 23 being pressed against the circuit board 11, whereby the main body section 21 returns to its initial state.

Also, this electrode terminal 20 is structured such that, when the main body section 21 returns to its initial state from the state shown in FIG. 6, the tilting of the first contact section 22 is released and the first contact section 22 returns to its initial state with the second contact section 23 being pressed against the circuit board 11, whereby the leading end side of the edge section 22a of the first contact section 22 is upwardly shifted to correspond to a substantially middle portion of the outer circumferential surface 17b of the battery 17 in a thickness direction (vertical direction), and this leading end of the edge section 22a reliably comes in contact with the outer circumferential surface 17b of the battery 17.

Figure 10:
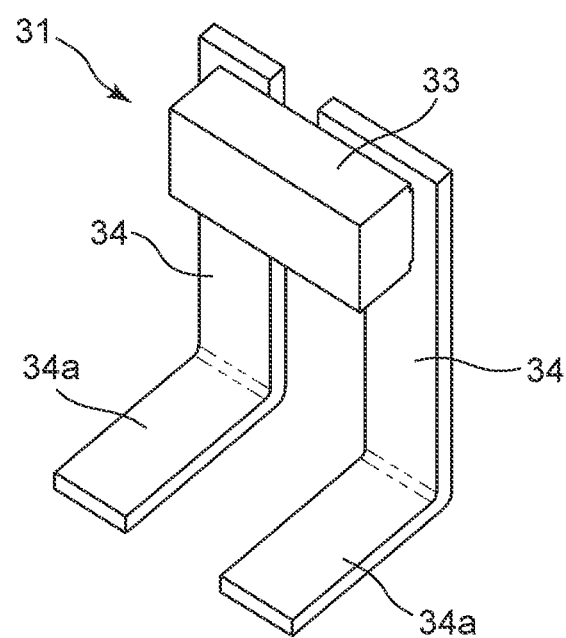
FIG. 10 is an enlarged perspective view of a light emitting member of the lighting device shown in FIG. 9.

The timepiece module 6 includes a lighting device 30 which illuminates the dial 8 that is an illumination target, as shown in FIG. 2 and FIG. 3. This lighting device 30 includes a light emitting member 31 which illuminates the upper surface of the dial 8 and an attachment adjusting member 32 which holds this light emitting member 31, as shown in FIG. 9 and FIG. 10. The light emitting member 31 includes a light emitting section 33 which emits light and a pair of supporting legs 34 which serves as contact sections that are electrically connected to a pair of electrodes of this light emitting section 33 (not shown in the drawings) and support the light emitting section 33.

The light emitting section 33 is a light source such as a light emitting diode (LED) whose outer shape is a chip shape that is a rectangular box shape, and the pair of electrodes is provided to be exposed on its back surface, as shown in FIG. 9 and FIG. 10. The pair of supporting legs 34 is made of a conductive metal and has a belt plate shape. This pair of supporting legs 34 is arranged on and attached to the back surface of the light emitting section 33 while being electrically connected to the pair of electrodes exposed to the back surface side.

Also, the pair of supporting legs 34 is formed such that its vertical length is sufficiently greater than the total length of the vertical length of the light emitting section 33 and the vertical length of the attachment adjusting member 32, as shown in FIG. 9 and FIG. 10. As a result, the pair of supporting legs 34 is structured to support the light emitting section 33 with this light emitting section 33 protruding above the attachment adjusting member 32.

The attachment adjusting member 32 is made of an insulative synthetic resin and has a substantially rectangular shape, as shown in FIG. 3 and FIG. 9. This attachment adjusting member 32 is structured to be independently arranged while enabling the adjustment of the arrangement of the light emitting section 33 on a predetermined portion of the outer circumferential part of the dial 8 with the pair of supporting legs 34 being held by this attachment adjusting member 32. Here, in this attachment adjusting member 32, a pair of attachment holes 32a into which the pair of supporting legs 34 is inserted is provided penetrating vertically. This pair of attachment holes 32a is formed such that its cross-sections have the same shape as those of the pair of supporting legs 34.

This attachment adjusting member 32 is structured to be arranged in a predetermined portion of a ring-shaped panel hold down member 35 which serves as an arrangement member that holds down the upper surface of the outer circumferential part of the solar panel 9 arranged below the dial 8, as shown in FIG. 3 and FIG. 9. The shape, size, height, color and the like of the attachment adjusting member 32 are determined in accordance with the panel hold down member 35 whose shape, size and height vary depending on the type of wristwatch. Accordingly, for example, this attachment adjusting member 32 is formed as a separate component and arranged in an attachment housing section 35a provided on the five o'clock side of the panel hold down member 35.

The panel hold down member 35 is structured to be arranged on the upper surface of the outer circumferential part of the housing 10 and hold down the upper surface of the outer circumferential part of the solar panel 9 on the housing 10, as shown in FIG. 3 and FIG. 9. Also, this panel hold down member 35 is formed to surround the outer circumferential part of the dial 8 arranged on the solar panel 9. Moreover, this panel hold down member 35 is structured such that its shape, size, height and the like are determined in accordance with the type of wristwatch.

Also, in a lower portion of the housing 10 corresponding to the attachment adjusting member 32, a cutout section 36 is provided which is larger than the attachment adjusting member 32 and extends from the outer circumferential part of the housing 10 toward the central side of the housing 10, as shown in FIG. 2 and FIG. 9. In the housing 10, a pair of insertion holes 10c into which the pair of supporting legs 34 of the light emitting member 31 is inserted is coaxially provided with the pair of attachment holes 32a of the attachment adjusting member 32 while corresponding to the cutout section 36.

Thus, the pair of supporting legs 34 is formed such that its lower end portions are inserted into the insertion holes 10c of the housing 10 and protrude downward, these lower end portions downwardly protruding from the pair of insertion holes 10c are bent with the attachment adjusting member 32 being arranged in the attachment housing section 35a of the panel hold down member 35, and these bent sections 34a are pressed against the upper inner surface of the cutout section 36, as shown in FIG. 9.

Accordingly, the pair of supporting legs 34 is formed such that their bending points are determined in accordance with the heights of the panel hold down member 35 and the cutout section 36 of the housing 10, as shown in FIG. 2 and FIG. 9. Also, the pair of supporting legs 34 is structured to attach and fix the light emitting member 31 and the attachment adjusting member 32 to the housing 10 by the bent sections 34a being pressed against the upper inner surface of the cutout section 36 by a pair of connecting members 37. Also, the attachment adjusting member 32 is formed to arrange the light emitting section 33 above the dial 8.

The pair of connecting members 37 is provided in the cutout section 36 of the housing 10, as shown in FIG. 9. Each of the pair of connecting members 37 is a coil spring and held by an attachment member 38. This pair of connecting members 37 is structured such that one end portions thereof come in resilient contact with a pair of electrodes (not shown in the drawings) of the circuit board 11 corresponding to the cutout section 36 of the housing 10, and the other end portions come in resilient contact with the bent sections 34a of the pair of supporting legs 34.

More specifically, the pair of connecting members 37 is structured to electrically connect the light emitting section 33 with the circuit board 11 via the pair of supporting legs 34, as shown in FIG. 9. The attachment member 38 is formed in a rectangular plate shape, in which a pair of holding holes 38a which holds the pair of connecting member 37 is provided penetrating vertically. As a result, the pair of connecting member 37 is structured to be inserted into the pair of holding holes 38a and held while protruding above and below this pair of holding holes 38a.

In the parting member 7 arranged above the panel hold down member 35, a light emitter housing section 7b is provided which is open toward the inner side of the wristwatch case 1 and in which the light emitting section 33 is arranged, as shown in FIG. 2. As a result, the lighting device 30 is structured such that light from the light emitting section 33 arranged in the light emitter housing section 7b of the parting member 7 is emitted toward the upper surface of the dial 8 from the open side of the light emitter housing section 7b so as to illuminate the dial 8.

Here, since the light emitter housing section 7b of the parting member 7 is open toward the inner side of the wristwatch case 1, the attachment adjusting member 32 can be undesirably seen from the inner side of the wristwatch case 1 through this open portion, as shown in FIG. 2. Accordingly, this attachment adjusting member 32 should preferably be colored in a color that is hard to be recognized from the inner side of the wristwatch case 1, such as a color similar to that of the parting member 7 or black.

Next, a procedure for assembling this wristwatch case 1 is described. In this procedure, first, the parting member 7 is inserted into and arranged in the upper opening of the wristwatch case 1 from above. Here, the light emitter housing section 7b of the parting member 7 is positioned corresponding to the five o'clock side of the wristwatch case 1. In this state, the watch glass 4 and the packing 4a are attached to the upper opening of the wristwatch case 1 located above the parting member 7.

Then, the timepiece module 6 is mounted in the wristwatch case 1 from below. Here, before this mounting, the timepiece module 6 is assembled. In this assembly, first, the display panel 13, the first timepiece movement 14, and the second timepiece movement 15 are attached to the housing 10. More specifically, the display panel 13 is arranged in a portion ranging from the three o'clock side to the six o'clock side of the housing 10. Then, the first timepiece movement 14 is arranged in a substantially central portion of the housing 10, and the second timepiece movement 15 is arranged on the nine o'clock side of the housing 10.

In this state, the solar panel 9 is arranged on the upper surface of the housing 10 such that the display window sections 9a on the three o'clock side and nine o'clock side of the solar panel 9 are positioned corresponding to the display panel 13. Then, the panel hold down member 35 is arranged on the outer circumferential part of the housing 10, and thereby holds down the upper surface of the outer circumferential part of the solar panel 9. Here, the attachment housing section 35a provided on the five o'clock side of the panel hold down member 35 is positioned corresponding to the cutout section 36 provided on the five o'clock side of the housing 10.

As a result, the lighting device 30 can be arranged. More specifically, the lighting device 30 is attached to the attachment housing section 35a of the panel hold down member 35 which holds down so as to attach the solar panel 9 to the housing 10. In this attachment, first, the pair of supporting legs 34 is attached to the back surface of the light emitting section 33 of the light emitting member 31 so as to electrically connect the pair of electrodes (not shown in the drawings) of the light emitting section 33 to the pair of supporting legs 34.

As a result, the light emitting member 31 where the light emitting section 33 is supported by the pair of supporting legs 34 is assembled. The pair of supporting legs 34 of this light emitting member 31 is inserted from above into the pair of attachment holes 32a of the attachment adjusting member 32 and protrudes below. By this insertion, the light emitting member 31 is attached to the attachment adjusting member 32. In this state, the attachment adjusting member 32 is arranged in the attachment housing section 35a of the panel hold down member 35 as a separate component. Note that the shape, size, height, color, and the like of this attachment adjusting member 32 have been determined in accordance with the panel hold down member 35 whose shape, size, and height vary depending on the type of wristwatch.

Then, the pair of supporting legs 34 protruding below the attachment adjusting member 32 is inserted into the pair of insertion holes 10c of the housing 10 located below the attachment housing section 35a of the panel hold down member 35 in a manner to protrude into the cutout section 36 of the housing 10. In this state, the pair of supporting legs 34 protruding in the cutout section 36 is bent and the bent sections 34a of the pair of supporting legs 34 are pressed against the upper inner surface of the cutout section 36.

As a result, the attachment adjusting member 32 and the light emitting member 31 are attached to and fixed to the housing 10 by the pair of supporting legs 34. In this state, the light emitting section 33 of the light emitting member 31 has been arranged above the panel hold down member 35, and the pair of connecting members 37 can be arranged below the bent sections 34a of the pair of supporting legs 34. By the above-described attachment, the lighting device 30 is attached to the five o'clock side of the housing 10 while being arranged in the attachment housing section 35a of the panel hold down member 35.

In this state, the electrode terminal 20 is attached to the area close to the inner circumferential part of the battery housing section 16 of the housing 10. Here, the main body section 21 of the electrode terminal 20 is inserted into and held by the holding section 25 provided close to the inner circumferential part of the battery housing section 16. More specifically, the main body section 21 is inserted into the space between the two holding wall sections 25a and 25b and the one holding wall section 25c and held between these two holding wall sections 25a and 25b and the one holding wall section 25c.

Here, the first contact section 22 of the electrode terminal 20 is arranged in the terminal housing section 26 formed in the inner circumferential part of the battery housing section 16. More specifically, the edge section 22a of the first contact section 22 extending from the side portion of the main body section 21 along the inner circumferential surface of the battery housing section 16 has been bent in the radial direction toward the inner side of the battery housing section 16, so that the leading end side of this bent edge section 22a protrudes into the battery housing section 16.

Also, here, the second contact section 23 of the electrode terminal 20 is arranged on the side of the circuit board 11 (upper side in FIG. 7) attached to the housing 10. More specifically, the second contact section 23 is extending in a substantially same direction as the first contact section 22 from one end portion (upper end portion in FIG. 7) of the main body section 21 on the circuit board 11 side in a manner to be gradually away from the first contact section 22 and to obliquely extend toward the circuit board 11 side (upper side in FIG. 7), and the edge section 23a thereof is arranged protruding from the housing 10 toward the circuit board 11 side.

Simultaneously, the receiving section 24 of the electrode terminal 20 is arranged on the bottom part of the battery housing section 16 on the side opposite to the circuit board 11. More specifically, the receiving section 24 is extending from the other end portion (lower end portion in FIG. 7) of the main body section 21 toward the center of the inner area of the battery housing section 16 in parallel with the bottom surface of the battery housing section 16, and the edge section 24a thereof is obliquely arranged toward the non-electrode surface 17c side (upper side in FIG. 6) of the battery 17 which is to be arranged in the battery housing section 16.

This state is the initial state of the electrode terminal 20. In other words, this is the state before the circuit board 11 is attached to the housing 10. In this initial state, the main body section 21 has been held by the holding section 25 without being tilted, and the first contact section 22 has been arranged in the terminal housing section 26 without being tilted. In addition, the second contact section 23 has been inclined toward the circuit board 11 side from the housing 10, the edge section 23a has been arranged protruding from the housing 10 toward the circuit board 11 side, and the receiving section 24 has been arranged in parallel with the bottom part of the battery housing section 16.

In this state, the circuit board 11 is arranged on the lower surface of the housing 10 and attached thereto by the plurality of screws 11a, as shown in FIG. 9. Before this attachment, the pair of connecting members 37 which is to electrically connect the lighting device 30 to the circuit board 11 is held by the pair of holding holes 38a of the attachment member 38, and arranged in the cutout section 36 of the housing 10 by this attachment member 38 in a manner to be positioned below the bent sections 34a of the pair of supporting legs 34 of the lighting device 30.

In this state, when the circuit board 11 is attached to the lower surface of the housing 10, the one end portions of the pair of connecting member 37 come in resilient contact with the pair of electrodes (not shown in the drawings) of the circuit board 11, and the other end portions come in resilient contact with the bent sections 34a of the pair of supporting legs 34. As a result, the light emitting section 33 and the circuit board 11 are electrically connected to each other by the pair of connecting members 37 and the pair of supporting legs 34.

When being attached to the housing 10, the circuit board 11 is pressed against the second contact section 23 of the electrode terminal 20, whereby the second contact section 23 is pressed toward the housing 10 side (lower side in FIG. 7) in a manner to be flexurally deformed, as shown in FIG. 6. As a result, the main body section 21 is tilted at the inclination angle θ while being held by the holding section 25, the first contact section 22 is tilted at the inclination angle θ toward the side opposite to the circuit board 11 side along with the tilting of the main body section 21, and the receiving section 24 is also tilted at the same inclination angle θ in the same direction.

Then, the metal hold down plate 12 is arranged on and attached to the lower surface of the circuit board 11. Here, the hold down plate 12 is arranged on a substantially half area of the housing 10 on the six o'clock side with reference to a substantially straight virtual line connecting the three o'clock side of the circuit board 11 with the nine o'clock side thereof, and the hook sections 12a formed on the plural portions on the outer peripheral part of the hold down plate 12 are engaged with the engaging projections 10a formed on the outer circumferential surface of the housing 10. As a result, the hold down plate 12 is attached to the housing 10 in a manner to hold down the circuit board 11 on the housing 10.

Here, the battery hold down section 18 formed on the three o'clock side of the hold down plate 12 has been arranged extending across the battery housing section 16 from the three o'clock side toward a substantially twelve o'clock side. In this state, the battery hook section 18b provided on the rim portion of the battery hold down section 18 on the twelve o'clock side can be engaged with the engaging section 10b provided on the twelve o'clock side of the housing 10 and positioned outside the battery housing section 16. As a result, the battery 17 can be housed in the battery housing section 16.

When the battery 17 is to be housed in the battery housing section 16, first, the engaging of the battery hook section 18b of the battery hold down section 18 with the engaging section 10b on the twelve o'clock side of the housing 10 is released, and the battery hold down section 18 is pulled upward in a direction to be away from the battery housing section 16 (refer to FIG. 8). As a result, the battery housing section 16 is opened, and then the battery 17 is inserted into the battery housing section 16. More specifically, the battery 17 is inserted from obliquely above into the battery housing section 16 in a direction substantially perpendicular to the longitudinal direction of the battery hold down section 18 from the outer circumferential part side of the housing 10.

In this insertion, the outer circumferential part of the battery 17 comes in contact with the edge section 22a, which constitutes the first contact section 22 of the electrode terminal 20 provided close to the inner circumferential part of the battery housing section 16 and is protruding in the battery housing section 16, from obliquely above. Here, since the first contact section 22 has been obliquely tilted at the inclination angle θ toward the side opposite to the circuit board 11 (lower side in FIG. 7), the outer circumferential part of the battery 17 smoothly slides along this tilted first contact section 22, whereby the battery 17 is housed in the battery housing section 16.

In addition, since the side section (upper side section in FIG. 7) 22b of the edge section 22a of the first contact section 22 which is opposing the circuit board 11 has been formed inclining toward the side opposite to the circuit board 11 and the leading end side of the edge section 22a has been formed in the tapered shape, the outer circumferential part of the battery 17 comes in contact with the side section 22b of the tapered edge section 22a of the first contact section 22 from obliquely above.

Here, the side section 22b of the edge section 22a is further tilted toward the side opposite to the circuit board 11 with the first contact section 22 being tilted toward the side opposite to the circuit board 11 (lower side in FIG. 7) at the inclination angle θ, and the outer circumferential part of the battery 17 further smoothly slides along this tilted side section 22b, whereby the battery 17 is housed in the battery housing section 16. Accordingly, even though the edge section 22a of the first contact section 22 is protruding in the battery housing section 16, the edge section 22a of the first contact section 22 does not become obstructive, whereby the battery 17 is easily and favorably housed in the battery housing section 16.

In this state, the battery hold down section 18 is arranged on the battery 17 and the battery hook section 18*b* provided on the rim portion of the battery hold down section 18 on the twelve o'clock side is engaged with the engaging section 10*b* provided on the twelve o'clock side of the housing 10 and positioned outside the battery housing section 16. As a result, the battery hold down section 18 holds down the battery 17 on the battery housing section 16 with the plurality of contacting pieces 18*a* being in contact with the electrode surface 17*a* of the battery 17.

Here, the battery 17 is held down on the battery housing section 16 by the battery hold down section 18. As a result, the receiving section 24 is pressed by the non-electrode surface 17*c* of the battery 17 with the second contact section 23 being pressed against the circuit board 11, the tilting of the receiving section 24 is released, and the tilting of the main body section 21 and that of the first contact section 22 are released along therewith. More specifically, this receiving section 24 is pressed by the non-electrode surface 17*c* such that its tilting is released and the receiving section 24 becomes parallel to the bottom part of the battery housing section 16

Accordingly, the tilting of the main body section 21 and that of the first contact section 22 are released, whereby the main body section 21 and the first contact section 22 return to their initial states. More specifically, in the state shown in FIG. 6, when the main body section 21 returns to the initial state, the first contact section 22 also returns to the initial state with the second contact section 23 being pressed against the circuit board 11 and electrically connected to the circuit board 11 stably, and the leading end side of the edge section 22*a* of the first contact section 22 is upwardly shifted to correspond to a substantially middle portion of the outer circumferential surface 17*b* of the battery 17 in the thickness direction (vertical direction), whereby the leading end of the edge section 22*a* reliably and favorably comes in contact with the outer circumferential surface 17*b* of the battery 17. As a result, the battery 17 is electrically connected to the circuit board 11 by the electrode terminal 20 and the battery hold down section 18.

Then, the timepiece module 6 is mounted in the wristwatch case 1. In this mounting, the dial 8 is arranged on the solar panel 9 arranged on the upper surface of the housing 10 and the outer circumferential part of the dial 8 is surrounded by the panel hold down member 35. Here, the pointer shaft 14*b* of the first timepiece movement 14 and the function pointer shaft 15*b* of the second timepiece movement 15 protrude above the dial 8. In this state, the pointers 14*a* are attached to the pointer shaft 14*b* of the first timepiece movement 14, the function pointer 15*a* is attached to the function pointer shaft 15*b* of the second timepiece movement 15, the timepiece module 6 is mounted in the wristwatch case 1, and the dial 8 is arranged below the parting member 7.

Here, the light emitting section 33 of the lighting device 30 arranged above the panel hold down member 35 is arranged in the light emitter housing section 7*b* of the parting member 7 so as to be arranged above the dial 8. As a result, the timepiece module 6 is favorably mounted in the wristwatch case 1. Subsequently, the switch sections 3 are attached to the two o'clock side, four o'clock side, eight o'clock side and ten o'clock side of the wristwatch case 1, and the back cover 5 is attached to the lower part of the wristwatch case 1 together with the waterproof packing 5*a*. As a result, the assembly of the wristwatch is completed.

Next, the usage of this wristwatch is described.

In a normal state of this wristwatch, the pointers 14*a* are driven above the dial 8 by the first timepiece movement 14 so as to indicate a time of day, and the function pointer 15*a* is driven above the dial 8 by the second timepiece movement 15 so as to indicate a function. Also, information such as a time of day, a date, and a day of the week displayed on the display panel 13 can be viewed from above the dial 8 through the display window sections 9*a* on the three o'clock side and six o'clock side of the solar panel 9.

When this wristwatch is to be used in a dark condition such as nighttime, one of the plurality of switch sections 3 on the two o'clock side, four o'clock side, eight o'clock side and ten o'clock side is operated to select a lighting mode where the light emitting section 33 of the light emitting member 31 of the lighting device 30 emits light to illuminate the dial 8. More specifically, since the light emitting section 33 has been arranged in the light emitter housing section 7*b* of the parting member 7 while being arranged above the dial 8 by the attachment adjusting member 32, and this light emitter housing section 7*b* is open toward the dial 8 side, light from the light emitting section 33 is emitted toward the upper surface of the dial 8 from this open portion.

As a result, in this wristwatch, since the dial 8 is illuminated by the lighting device 30, the display of a time of day by the pointers 14*a*, the display of a function by the function pointer 15*a*, and the display of information by the display panel 13 can be favorably viewed even in a dark condition. Also, the light emitter housing section 7*b* of the parting member 7 is open toward the dial 8 side.

Accordingly, the attachment adjusting member 32 can be undesirably seen from the inner side of the wristwatch case 1 through this open portion. However, by being colored in a color similar to that of the parting member 7 or black, this attachment adjusting member 32 is hard to be recognized from the inner side of the wristwatch case 1, which enhances the design.

As described above, the electrode terminal 20 of this wristwatch includes the main body section 21 which is held in the circumferential rim portion of the battery housing section 16 that houses the battery 17, the first contact section 22 which is provided on the main body section 21 and comes in contact with the outer circumferential surface 17*b* of the battery 17 housed in the battery housing section 16, and the second contact section 23 which is provided on the portion of the main body section 21 located on the side of the circuit board 11 that is arranged on an outer surface of the battery housing section 16, and pressed against the circuit board 11 in a manner to tilt the first contact section 22 and the main body section 21 toward the side opposite to the circuit board 11. As a result, the housing of the battery 17 can be facilitated.

More specifically, in this electrode terminal 20, the edge section 22*a* of the first contact section 22 protrudes into the battery housing section 16. Accordingly, the outer circumferential part of the battery 17 comes in contact with the edge section 22*a* of the first contact section 22 when the battery 17 is housed in the battery housing section 16. However, since the first contact section 22 has been tilted toward the side opposite to the circuit board 11, the outer circumferential part of the battery 17 can smoothly slide along the tilted first contact section 22. As a result of this structure, the edge section 22*a* of the first contact section 22 does not become obstructive, and the battery 17 can be easily and favorably housed in the battery housing section 16, whereby the housing of the battery 17 can be facilitated.

Also, in this electrode terminal 20, the first contact section 22 is provided along the inner circumferential surface of the battery housing section 16. As a result, after coming in contact with the edge section 22a of the first contact section 22, the outer circumferential part of the battery 17 smoothly slides along the first contact section 22 provided along the inner circumferential surface of the battery housing section 16, whereby the battery 17 can be easily and favorably housed in the battery housing section 16.

Moreover, in this electrode terminal 20, the main body section 21 is held by the holding section 25 in the circumferential rim portion of the battery housing section 16 in a manner to be tiltable. As a result, when the second contact section 23 is pressed against the circuit board 11, the main body section 21 held by the holding section 25 can be easily tilted, whereby the first contact section 22 can be favorably tilted toward the side opposite to the circuit board 11.

More specifically, the holding section 25 includes the three holding wall sections 25a to 25c which hold the main body section 21 at the three points. Among these three holding wall sections 25a to 25c, the two holding wall sections 25a and 25b are arranged on the inner side of the circumferential rim portion of the battery housing section 16, and the remaining one holding wall section 25c having the semi-cylindrical projection is arranged outside the battery housing section 16 with its projection corresponding to the middle point between the two holding wall sections 25a and 25b. As a result of this structure, the main body section 21 can be favorably held between the two holding wall sections 25a and 25b and the one holding wall section 25c in a manner to be tiltable.

Also, in this electrode terminal 20, the edge section 22a of the first contact section 22 extending from the side portion of the main body section 21 along the inner circumferential surface of the battery housing section 16 comes in contact with the outer circumferential surface 17b of the battery 17, and the edge section 23a of the second contact section 23 extending in a substantially same direction as the first contact section 22 from the one end portion of the main body section 21 on the circuit board 11 side in a manner to be gradually away from the first contact section 22 is pressed against the circuit board 11. As a result of this structure, by the second contact section 23 pressed by the circuit board 11 toward the battery housing section 16 side, the first contact section 22 and the main body section 21 can be favorably tilted toward the side opposite to the circuit board 11.

Moreover, in this electrode terminal 20, the edge section 22a of the first contact section 22 has the tapered shape where the side section 22b opposing the circuit board 11 has been formed inclining toward the side opposite to the circuit board 11. As a result, when the edge section 22a of the first contact section 22 is tilted toward the side opposite to the circuit board 11, the side section 22b of the edge section 22a can be further tilted toward the side opposite to the circuit board 11.

By this structure, in this electrode terminal 20, even though the outer circumferential part of the battery 17 comes in contact with the edge section 22a of the first contact section 22 when the battery 17 is housed in the battery housing section 16, this outer circumferential part of the battery 17 can more smoothly slide along the side section 22b of the edge section 22a further tilted when the edge section 22a of the first contact section 22 is tilted. As a result, the battery 17 can be favorably housed in the battery housing section 16.

Also, in this electrode terminal 20, the receiving section 24, against which the non-electrode surface 17c that is one surface of the battery 17 housed in the battery housing section 16 is pressed, is formed on the other end portion of the main body section 21 on the side opposite to the circuit board 11. As a result, when the second contact section 23 is pressed against the circuit board 11 and the first contact section 22 is tilted toward the side opposite to the circuit board 11 together with the main body section 21, the receiving section 24 is also tilted in the same direction. In this state, when the battery 17 housed in the battery housing section 16 is pressed against the receiving section 24, the tilting of the receiving section 24 is released, whereby the tilting of the main body section 21 and that of the first contact section 22 can be released.

More specifically, in this electrode terminal 20, when the battery 17 is housed in the battery housing section 16 and the non-electrode surface 17c of the battery 17 is pressed, the tilting of the receiving section 24 is released with the second contact section 23 being pressed against the circuit board 11, and the tilting of the main body section 21 and that of the first contact section 22 are released along therewith. As a result, even though the main body section 21 and the first contact section 22 have been tilted toward the side opposite to the circuit board 11 in the state before the battery 17 is housed in the battery housing section 16, the tilting of the main body section 21 and that of the first contact section 22 can be released.

Thus, when the tilting of the main body section 21 and that of the first contact section 22 are released with the second contact section 23 being pressed against the circuit board 11, this electrode terminal 20 returns to the state before the second contact section 23 is pressed against the circuit board 11, that is, the initial state where the main body section 21 is held by the holding section 25, and the first contact section 22 returns to the initial state along therewith, whereby the leading end side of the edge section 22a of the first contact section 22 can be upwardly shifted.

By this structure, in this electrode terminal 20, since the leading end side of the edge section 22a can be positioned corresponding to a substantially middle portion of the outer circumferential surface 17b of the battery 17 in the thickness direction, the leading end of the edge section 22a can reliably and favorably come in contact with the outer circumferential surface 17b that serves as the plus electrode of the battery 17 housed in the battery housing section 16. As a result, the outer circumferential surface 17b serving as the plus electrode of the battery 17 and the circuit board 11 can be electrically connected to each other reliably and favorably.

Also, in the case of the timepiece module 6 of this wristwatch, the edge section 22a of the first contact section 22 of the electrode terminal 20 protrudes into the battery housing section 16. However, since the first contact section 22 is tilted toward the side opposite to the circuit board 11, the outer circumferential portion of the battery 17 can smoothly slide along the tilted first contact section 22 even when the outer circumferential part of the battery 17 comes in contact with the edge section 22a of the first contact section 22 during the housing of the battery 17 in the battery housing section 16. As a result of this structure, the edge section 22a of the first contact section 22 does not become obstructive and the battery 17 can be easily and favorably housed in the battery housing section 16, whereby the housing of the battery 17 can be facilitated.

Moreover, this timepiece module 6 includes the battery hold down section 18 which comes in contact with the electrode surface 17a that is the other surface on the side opposite to the non-electrode surface 17c of the battery 17 housed in the battery housing section 16, holds down the battery 17 on the battery housing section 16, and electrically connects the battery 17 to the circuit board 11. As a result, by this battery hold down section 18, the battery 17 can be reliably held down on and favorably housed in the battery housing section 16, and the electrode surface 17a serving as the minus electrode of the battery 17 and the circuit board 11 can be electrically connected to each other reliably and favorably.

Furthermore, in the case of this timepiece module 6, since the battery 17 can be held down on and favorably housed in the battery housing section 16 by the battery hold down section 18, the non-electrode surface 17c of the battery 17 can be reliably pressed against the receiving section 24 of the electrode terminal 20, whereby the tilting of the receiving section 24 can be reliably released, and the edge section 22a of the first contact section 22 can favorably come in contact with the outer circumferential surface 17b serving as the plus electrode of the battery 17 with the second contact section 23 being pressed against the circuit board 11. As a result, the outer circumferential surface 17b serving as the plus electrode of the battery 17 and the circuit board 11 can be electrically connected to each other reliably.

Still further, in the case of this timepiece module 6, the battery housing section 16 is formed in the circumferential rim portion of the housing 10, and the first contact section 22 is provided on the circumferential rim side of the housing 10 so as to be positioned away from the center of the housing 10. As a result, even though the display panel 13, the first timepiece movement 14, the second timepiece movement 15, and the like are mounted in the housing 10, the battery housing section 16 and the first contact section 22 can be favorably provided in the housing 10 in a manner not to obstruct these components.

In the above-described embodiment, the lighting device 30 is provided on the five o'clock side of the dial 8. However, in the present invention, the lighting device 30 is not necessarily required to be provided on the five o'clock side and may be provided on an arbitrary outer circumferential portion of the dial 8.

Also, in the above-described embodiment, the lighting device 30 illuminates the dial 8. However, in the present invention, the illumination target is not necessarily required to be the dial 8, and the lighting device 30 may illuminate a different target such as the display panel 13. In this case, the lighting device is arranged around the display panel 13.

Moreover, in the above-described embodiment, the present invention is applied to a wristwatch. However, the application target of the present invention is not necessarily required to be a wristwatch, and the present invention is applicable to various types of timepieces such as a travel watch, an alarm clock, a table clock, and a wall clock. Also, the application target of the present invention is not necessarily required to be a timepiece, and the present invention is also applicable to various types of electronic devices such as a cellular phone and a portable information terminal.

While the present invention has been described with reference to the preferred embodiments, it is intended that the invention be not limited by any of the details of the description therein but includes all the embodiments which fall within the scope of the appended claims.

INDUSTRIAL APPLICABILITY

According to the present invention, the housing of the battery can be facilitated.

The invention claimed is:

1. An electrode terminal comprising:
    a main body section which is held in a circumferential rim portion of a battery housing section that houses a battery;
    a first contact section which is provided on the main body section and comes in contact with an outer circumferential surface of the battery housed in the battery housing section;
    a second contact section which is provided on a portion of the main body section located on a side of a circuit board that is arranged on an outer surface of the battery housing section and pressed against the circuit board in a manner to tilt the first contact section and the main body section toward a side opposite to the circuit board; and
    a receiving section which is provided on an other end portion of the main body section on the side opposite to the circuit board and arranged on a bottom part of the battery housing section,
    wherein tilting of the receiving section is released when pressed by the battery housed in the battery housing section, and tilting of the main body section and tilting of the first contacting section are released along therewith.

2. The electrode terminal according to claim 1, wherein the first contact section is provided along an inner circumferential surface of the battery housing section.

3. The electrode terminal according to claim 1, wherein the main body section is held by a holding section provided in the circumferential rim portion of the battery housing section in a manner to be tiltable.

4. The electrode terminal according to claim 1, wherein an edge section of the first contact section extending from a side portion of the main body section along the inner circumferential surface of the battery housing section comes in contact with the outer circumferential surface of the battery, and an edge section of the second contact section extending in a substantially same direction as the first contact section from one end portion of the main body section on the circuit board side is pressed against the circuit board.

5. The electrode terminal according to claim 4, wherein the edge section of the first contact section is formed in a tapered shape whose side section opposing the circuit board has been inclined toward the side opposite to the circuit board.

6. The electrode terminal according to claim 1, wherein a non-electrode surface that is one surface of the battery housed in the battery housing section is pressed against the receiving section.

7. The electrode terminal according to claim 6, wherein tilting of the receiving section is released when the non-electrode surface of the battery housed in the battery housing section is pressed against the receiving section, and tilting of the main body section and tilting of the first contact section are released along with the release of the tilting of the receiving section.

8. A module comprising the electrode terminal according to claim 1.

9. The module according to claim 8 comprising: a battery hold down section which comes in contact with an electrode surface that is an other surface on a side opposite to the non-electrode surface of the battery housed in the battery housing section, holds down the battery on the battery housing section, and electrically connects the battery to the circuit board.

10. The module terminal according to claim 8, wherein the battery housing section is provided in a circumferential rim portion of a housing, and wherein the first contact section is provided on the circumferential rim side of the housing so as to be positioned away from center of the housing.

11. A timepiece comprising the module according to claim 8.

* * * * *